(12) United States Patent
Unrath (10) Patent No.: US 6,183,042 B1
(45) Date of Patent: Feb. 6, 2001

(54) MOBILE APPARATUS FOR SECURELY RETRIEVING AND PLACING MARKERS ON A SURFACE AND METHOD THEREFOR

(76) Inventor: Albert W. Unrath, 1610 Bethlehem Pike, Hatfield, PA (US) 19440

( * ) Notice: Under 35 U.S.C. 154(b), the term of this patent shall be extended for 0 days.

(21) Appl. No.: 09/217,308

(22) Filed: Dec. 21, 1998

(51) Int. Cl.⁷ .................................. B60J 7/00; B60R 19/38
(52) U.S. Cl. ........................... 296/189; 296/25; 296/183; 293/118; 293/133
(58) Field of Search ........................... 296/25, 183, 189; 293/133, 118; 414/434, 436

(56) References Cited

U.S. PATENT DOCUMENTS

| | | | |
|---|---|---|---|
| 3,776,400 | * 12/1973 | Schwartz | 296/183 |
| 4,162,099 | * 7/1979 | Schopf | 296/183 |
| 4,403,802 | * 9/1983 | Jones | 296/25 |
| 4,711,481 | * 12/1987 | Krage et al. | 293/133 |
| 4,770,420 | * 9/1988 | Gottwald et al. | 293/133 |
| 5,199,755 | 4/1993 | Gertz | 293/120 |
| 5,244,334 | * 9/1993 | Akita et al. | 414/502 |
| 5,248,129 | * 9/1993 | Gertz | 293/133 |
| 5,328,066 | * 7/1994 | Cappuccio et al. | 224/42.03 |
| 5,476,301 | 12/1995 | Berkich | 296/3 |
| 5,697,657 | * 12/1997 | Unrath | 293/133 |
| 5,947,452 | * 9/1999 | Albritton | 293/133 |
| 6,056,498 | * 5/2000 | Velinsky et al. | 414/555 |

* cited by examiner

Primary Examiner—Joseph D. Pape
Assistant Examiner—Kiran Patel
(74) Attorney, Agent, or Firm—Edward J. Howard; Buchanan Ingersoll (57) ABSTRACT

There is disclosed a mobile unit operative for securely storing and placing markers onto a surface, comprising a bed coupled to a portion of the mobile unit comprising a planar surface for storing the markers; a well area coupled to a rear portion of the bed and having an at least one well structure coupled to the first planar surface, the well structure having a bottom and side walls for housing a person for placing or retrieving said markers on the surface, wherein the at least one well structure and the first planar surface are positionally aligned to permit retrieval/storage of a marker from the first planar surface for placement/retrieval on the surface via said person located within the well.

21 Claims, 13 Drawing Sheets

MOBILE APPARATUS FOR SECURELY RETRIEVING AND PLACING MARKERS ON A SURFACE AND METHOD THEREFOR

FIELD OF THE INVENTION

The invention relates generally to vehicular safety systems, and more particularly to a mobile vehicular safety system for securely storing and placing markers onto a road surface.

BACKGROUND OF THE INVENTION

Our nation's roads and highways represent the life blood of our transportation system and impact on our daily lives in significant and myriad ways. Commercial enterprises such as commerce, industry, trucking and livery and public-funded entities such as police, firefighters, emergency response units, and countless other organizations and individuals in both the private and public sectors rely on local, state, and federal transportation departments to provide and maintain a sound infrastructure of roads and highways.

However, in order to support such an infrastructure, road construction and maintenance represents an ongoing and essential activity. While most travelers view road construction and road crews merely as an annoyance or impediment to timely arrival at their intended destination, clearly such a view is misplaced. Rather those who work to build and maintain the roadways facilitate, in the long run, quick easy and efficient access to location that would otherwise be difficult, if not impossible, to reach. In addition, road crew personnel assume a substantial risk of bodily injury from both unwary or inattentive drivers, as well as from other road construction equipment. For example, in the course of placing road markers such as cones, barriers, or signs, used to notify and alert drivers, road crew personnel have often been injured and even killed.

A number of solutions have been developed in the past to prevent such injuries to road crew personnel and to provide a safer and more secure work environment to those individuals in the act of placing or retrieving markers from the road surface. For example, an impact attenuation device placed on the back of a truck or other vehicle provides some measure of security to such road crew personnel. However, it is typical that in the course of placing or retrieving markers, such persons performing the task walk alongside the maintenance vehicle, and are thus left unprotected and susceptible to injuries from other drivers or by the vehicle itself. Accordingly, it is highly desirable to obtain a more secure apparatus and method for retrieving and placing markers onto a road surface.

SUMMARY OF THE INVENTION

It is an object of the present invention to provide a mobile unit operative for securely storing and placing markers onto a surface, comprising a front cab; a bed coupled to a rear of the front cab, the bed comprising a planar surface for storing the markers; a well area coupled to a rear portion of the bed and having an at least one well structure coupled to the first planar surface, the well structure having a bottom and side walls for housing a person for placing or retrieving the markers on the surface, wherein the at least one well structure and the first planar surface are positionally aligned to permit retrieval/storage of a marker from the first planar surface for placement/retrieval on the surface via the person located within the well.

It is a further object of the present invention to provide a method for securely storing and placing markers onto a road surface from a mobile vehicle comprising the steps of providing a first planar surface for storing the markers; coupling at least one well structure to an end of the first planar surface, the well structure having a first side wall integrally coupled to the end of the first planar surface, a second side wall opposite the first side wall, an interior side wall connected between said first and second opposite side walls, an exterior opening and a bottom floor; and placing a person within the well and operating in a first mode by removing the markers from the first planar surface and placing on the road surface by the person within the well, and in a second mode, removing from the surface the markers and storing onto the first planar surface by the person within the well structure.

DETAILED DESCRIPTION OF THE INVENTION

Figure 1:
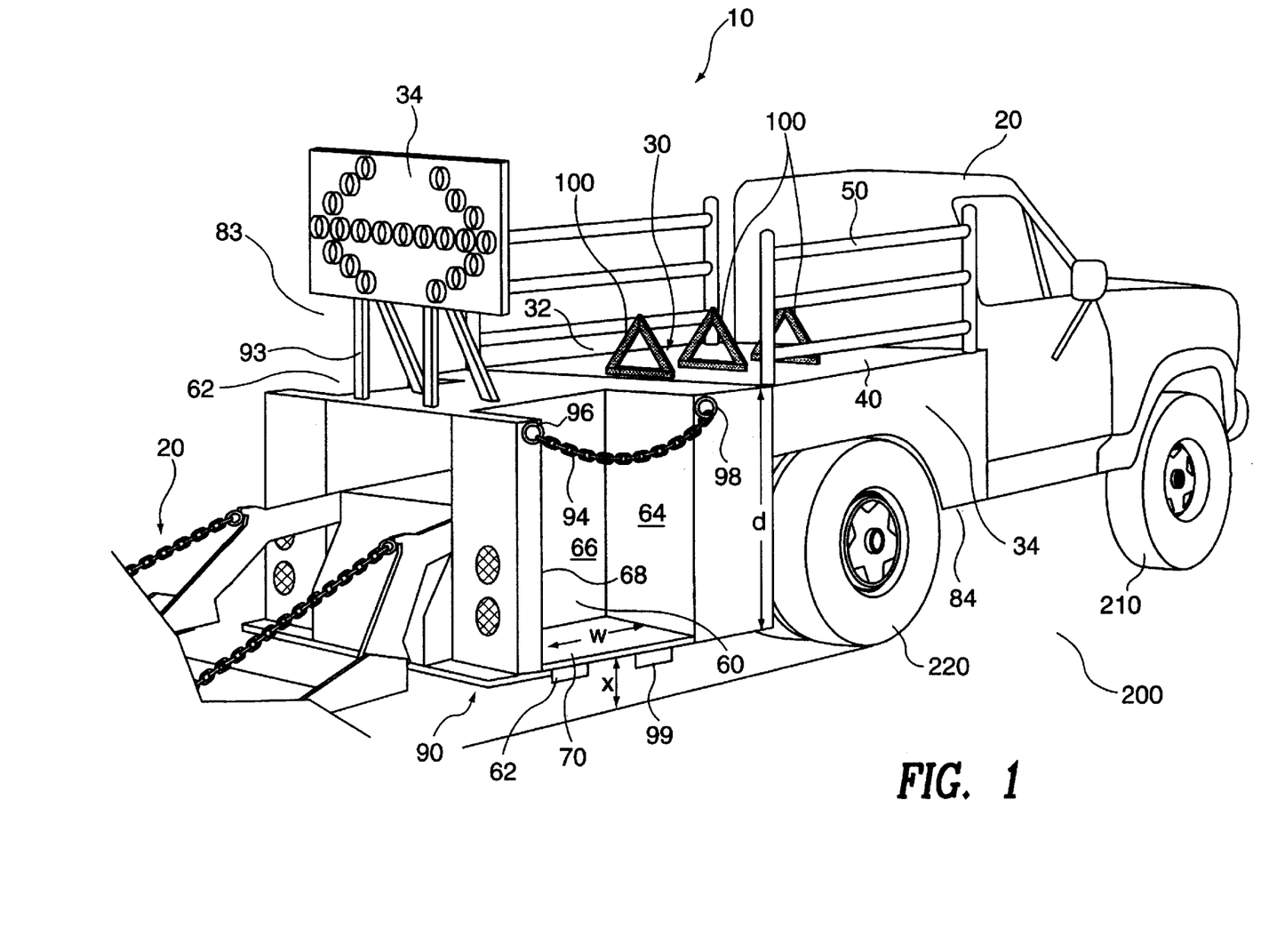
FIG. 1 is a perspective view of the mobile vehicle apparatus having a well structure for retaining a crew member for storing or retrieving markers according to an embodiment of the present invention.

Referring now to FIG. 1, there is shown a perspective view of a preferred embodiment of the present invention. FIG. 1 illustrates a mobile vehicle apparatus 10 such as a truck comprising a cab portion 20 for housing a driver 22. The truck is equipped with a bed 30 integrally coupled to a rear of the cab portion 20 by conventional means. The bed comprises a first substantially planar surface 40 having a width WI and a length Lt. The surface 40 is substantially flat for accommodating road markers such as road signs, cones, barrels, and so on. Retainer walls 50 extend vertically upward from the sides 32 and 34 of the planar surface to help retain and support markers 100 stored onto the planar surface bed area. A well area 90 comprising first and second well structures 60, 62 each disposed opposite one another and positioned in an integral manner with the end portion 64 of planar surface 40 is connected to the bed 30 via conventional means. Each corresponding well structure 60, 62 comprises each of the same elements as will be identified below. In referring to the drawings, like parts are indicated by like reference numerals.

Referring now to FIG. 1, well structure 60 includes three side walls 64, 66, 68 extending vertically from a bottom surface 70 at right angles to one another forming a box-like region for housing a road crew member 230 (FIG. 2) tasked to distribute markers onto a road the surface 200. An opening 72 opposite wall 66 permits entry and exit of the well structure 60 to and from the road surface and is located on a lateral side 34 (i.e. 32 for well structure 62) of the truck. The bed 30 is mounted to and supported by a chassis or frame 84 using well known, conventional means. The well area including the well structures 60, 62 is preferably made of a strong and durable material, such as steel, capable of withstanding various weather conditions (for example rain, snow, heat, cold etc.), as well as high impact collisions. Well area 90 comprising each of the well structures 60 and 62 is of a length d extending in a substantially vertical downward direction from a top portion 12 which is coplanar with surface 40. The well area is disposed behind both sets of front and rear wheels 210, 220 to provide an additional safety measure for preventing a worker from injury via the truck wheels. The structure 90 extends downward to a point such that bottom surface 70 of well structure 60 is a distance x from road surface 200. Preferably the distance x is approximately 6 inches to facilitate a natural step-up/step-down from the road surface. Stiffeners 99 are welded to the underside of bottom surface 70 via conventional means to provide rigidity and stiffness to the standing surface 70. The surface 70 is preferably coated with an anti-skid material to prevent slippage.

Figure 2A:
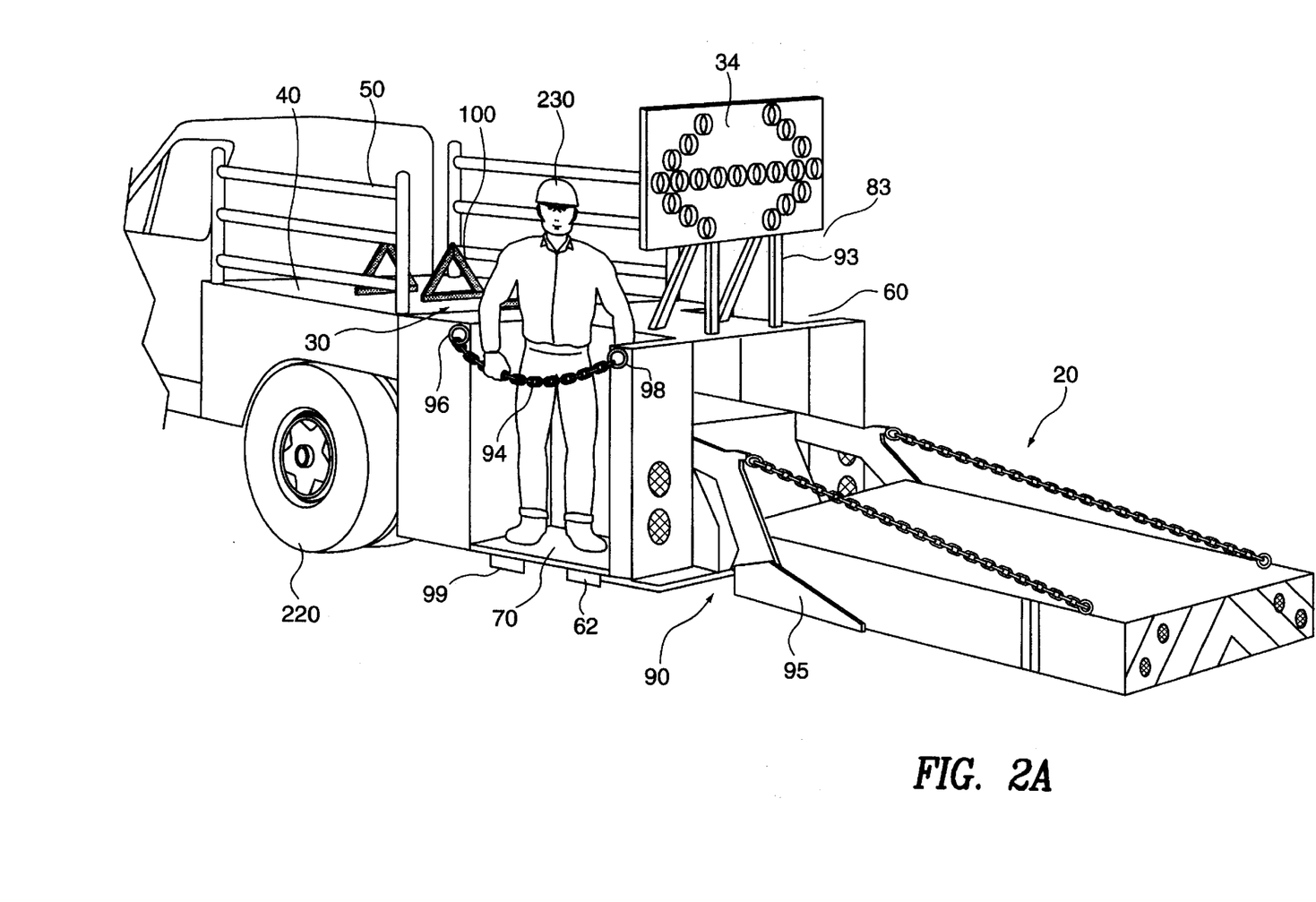
FIG. 2A is a perspective view of the mobile vehicle apparatus of FIG. 1 from the opposite side as that shown in FIG. 1.
Figure 2B:
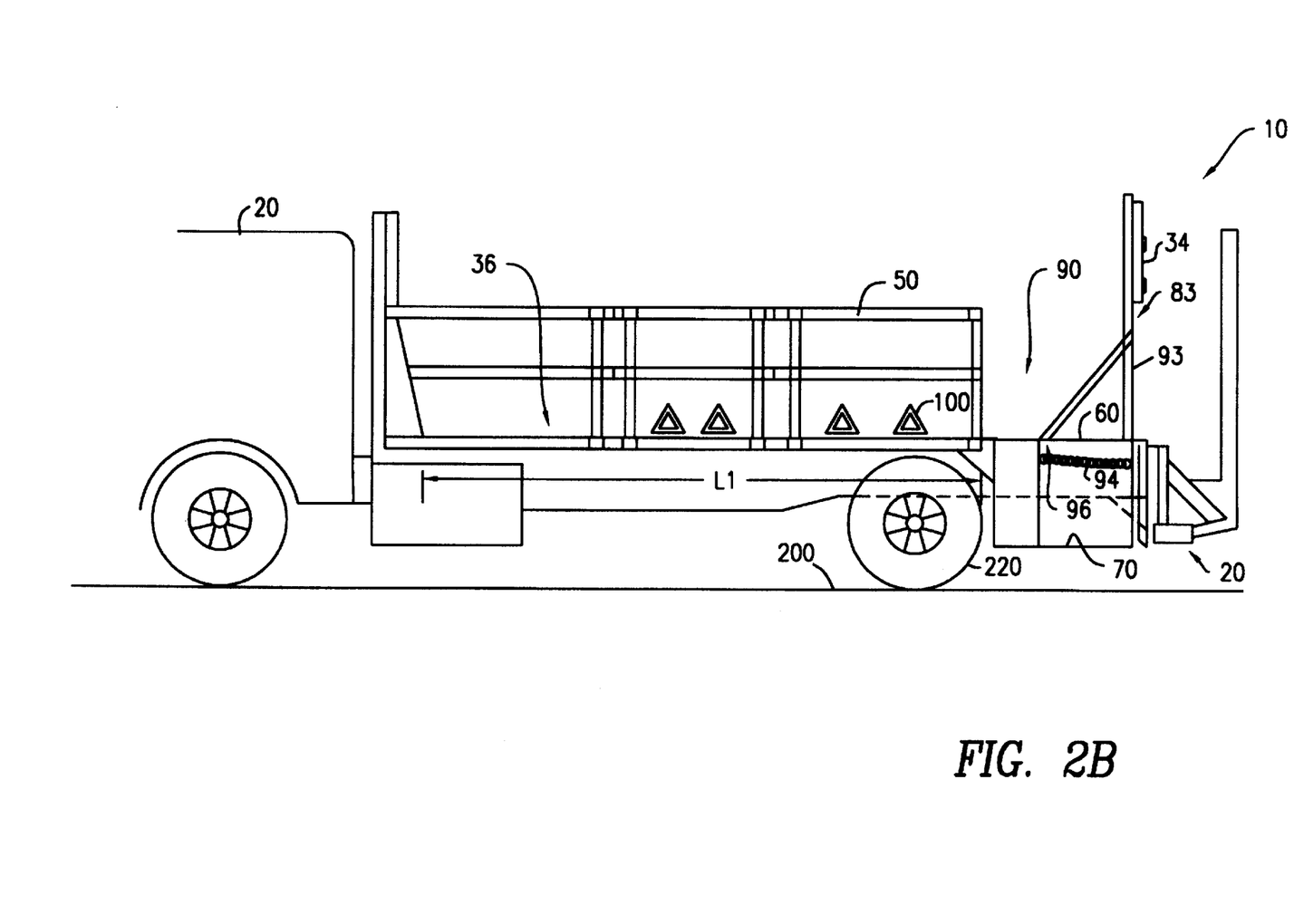
FIG. 2B is a side view of the mobile vehicle apparatus according to the embodiment depicted in FIGS. 1 and 2A.
Figure 2C:
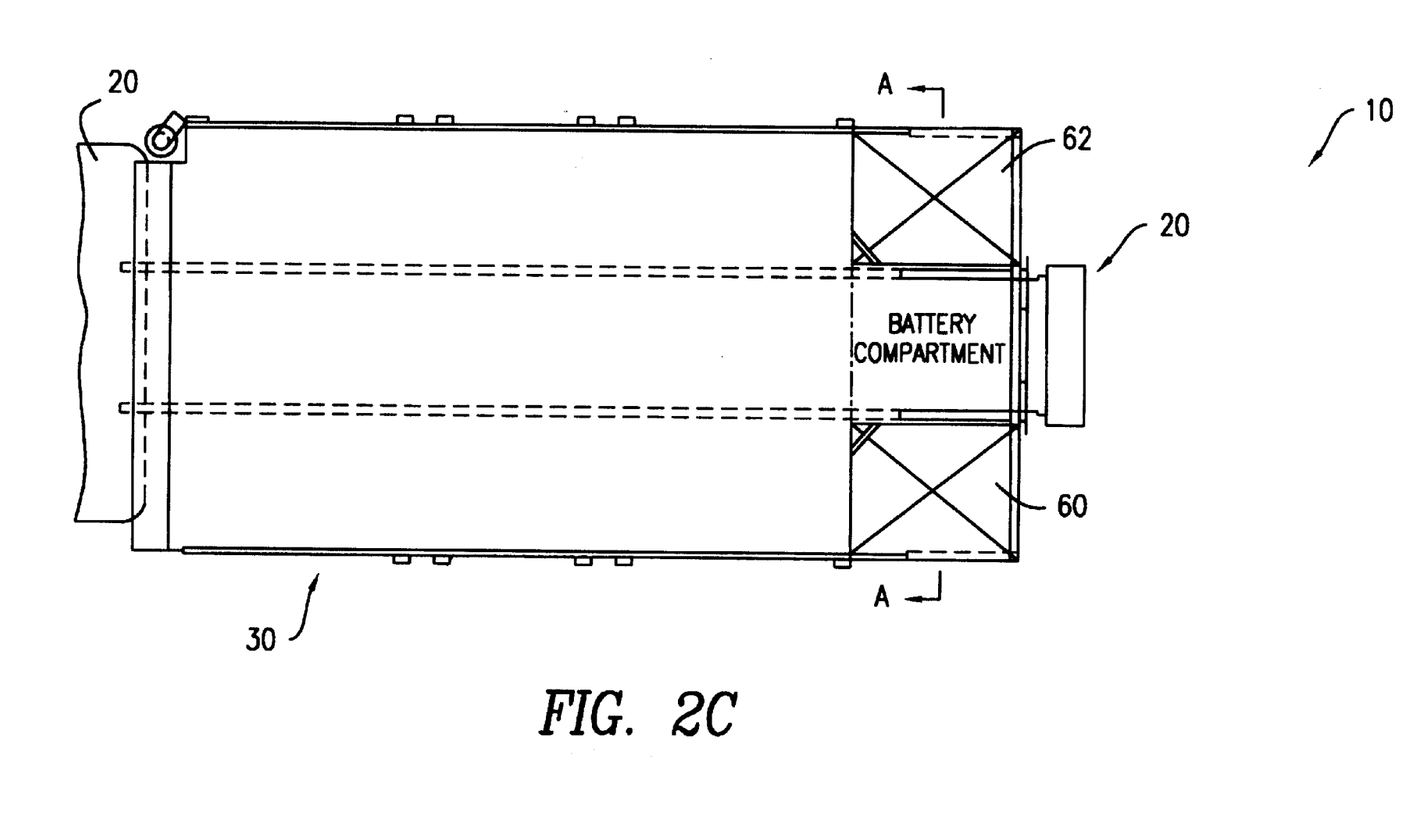
FIG. 2C is a top view of the embodiment of FIGS. 1 and 2A.

FIG. 2A shows a perspective view of the mobile unit 10 from side 32 showing identically oriented well structure 62 oppositely positioned with respect to well structure 60, while FIG. 2B provides a more schematic side view of the moblie unit and well structure. FIG. 2C illustrates a top view of the bed and well area positioned behind the rear tandem wheels 220 according to the first embodiment. As shown in FIGS. 1 and 2, the well area 90 may further comprise a sign board area 83 interposed between the first and second well structures 60, 62 which supports a notification area 34 such as an electronic arrow board or solar or battery-operated information board for alerting oncoming drivers of road construction. The sign board is typically connected to the well area structure by a series of steel beams 93 and may be either welded and/or bolted together to form a secure structure. The well area itself may also be formed by means of a series of welds and/or bolts bonding the first well structure, the board structure, and the second well structure together, or may be formed as a single monolithic molded steel or metal structure which is then connected to the end of planar surface 40.

A retaining mechanism comprising a chain 94 is coupled to a hook 96 extending from a side of opening 70 and extends across the opening to detachably connect with a second hook 98 on the opposite side. The side walls within each well structure extend vertically approximately 4 feet while the dimensions of the well structure are approximately 4 ft.×3 ft. in order to securely retain the person within the well structure. Similarly, chain 94 extends across the opening at substantially the top of the side walls and at a point substantially near the mid-section of a normal sized male in order to permit one to reach or lean over the side of the truck to pick up or place a marker while preventing him from tipping over onto the road surface. The size and height of the well structures may be adjusted depending on safety requirements and regulations, or other safety related concerns. Note also that each well structure 60, 62 may also be formed having different shapes and/or dimensions according to particular requirements.

Figure 4:
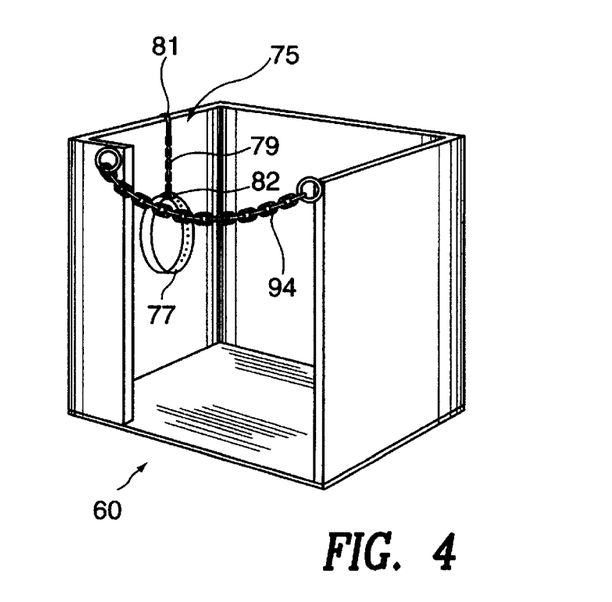
FIG. 4 is a perspective view of a well structure for containing a crew member according to an embodiment of the present invention.

The well structure 60, 62 may further include a harness arrangement 75 shown in FIG. 4, comprising a belt 77 used for securing around the body of a crew member within the well and a chain 79 which has a first end coupled to the belt using conventional means such as a hoop 82 fastened to the belt, and a second end connected to a hook 81 extending from one of the sidewalls. In this manner the harness operates to securely retain the person within the well structure so as to prevent inadvertent exit therefrom. Such protection is twofold, preventing a member from either inadvertently exiting onto the road surface or entering onto the bed portion of the truck. The chain is of a length sufficient to permit movement within the well structure while limiting migration outside of the structure.

Figure 3A:
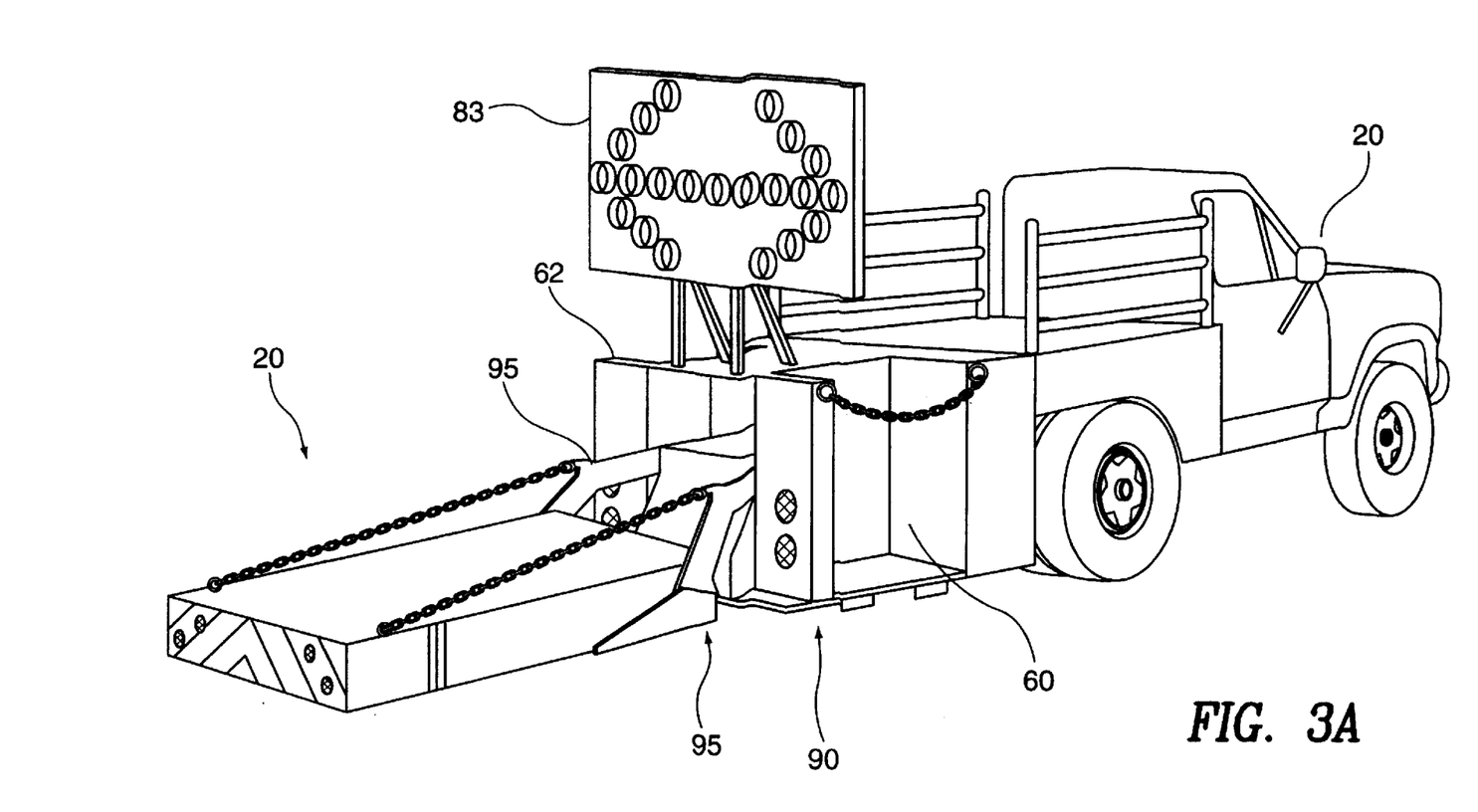
FIGS. 3A–B show perspective views of the mobile vehicle apparatus including a crash attenuation unit mounted thereon.
Figure 3B:
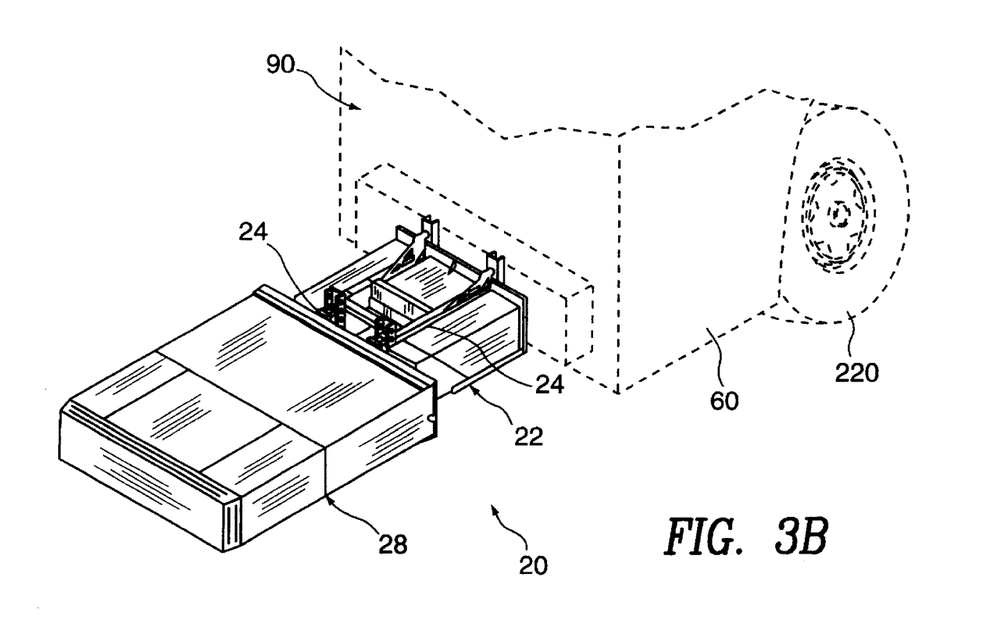

As best shown in FIG. 3B, a crash attenuation unit 20 may be adapted to be mounted to the back of the well area 90 of the truck in order to direct the motion of a vehicle colliding with the attenuator so as to dissipate its impact energy. Such an attenuator unit is disclosed in U.S. Pat. No. 5,697,657 entitled "VEHICLE MOUNTED CRASH ATTENUATION SYSTEM" by Albert W. Unrath, Sr., issued Dec. 16, 1997, and incorporated herein by reference. As shown in FIG. 3, the crash attenuator generally comprises a frame 22 adapted to be mounted on a vehicle, and a slider 24 mounted on the frame to telescope relative to the frame toward the vehicle in response to an impact where at least one collapsible energy-absorbing member is positioned between the slider 24 and the frame 22 to absorb energy as the slider telescopes relative to the frame. A crushable energy-absorbing crash cushion 28 is provided on the outboard side of the slider. The crushable energy-absorbing crash cushion is pivotally mounted to the slider about its horizontal axis to allow pivoting between a horizontally-deployed position in which the cushion extends generally outwardly from the vehicle, and the vertical position in which the crash cushion extends vertically upward. FIGS. 1, 2 and 3A illustrate portions of a crash attenuation unit connected to the posterior well area 90, including hinge 95 which allows vertical and horizontal deployment. Alternatively, a lift apparatus in combination with an attenuator cushion as disclosed in co-pending patent application Ser. No. 09/181,191 filed Oct. 28, 1998, entitled "LIFT APPARATUS FOR ATTENUATOR CUSHION" by Albert W. Unrath, Sr., the subject matter being incorporated herein by reference, may be utilized and mounted to the back of the well area 90 of the truck in order to direct the motion of the vehicle colliding with the attenuator in order to dissipate its impact energy. As previously mentioned, the crash attenuator is mounted to the well area such that the well area is interposed between the crash attenuator unit and the truck bed thereby providing additional security and safety measures to the road crew members. As shown in FIG. 3, each well structure 60 is disposed at a location distant to the rear truck wheels 220 so as to minimize the potential for a crew member operating within the well structure from falling under the wheels. Note that the bottom of the well structure is a short distance, preferably about six inches, from the road surface to allow easy step up/step down from/to the road.

Figure 5A:
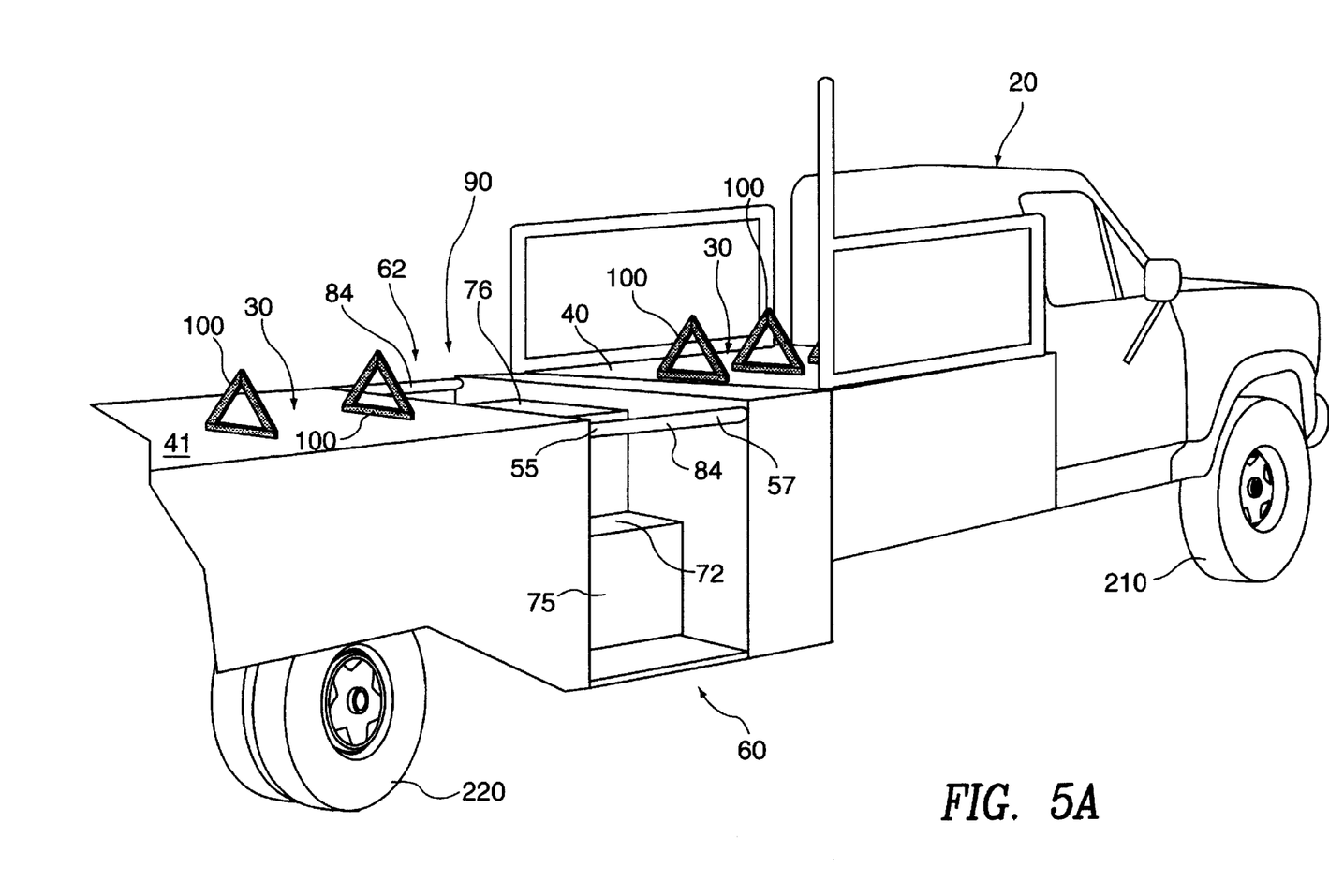
FIG. 5A is a perspective view of the mobile vehicle apparatus having a well structure for retaining a crew member for storing or retrieving markers according to an alternative embodiment of the present invention.
Figure 5B:
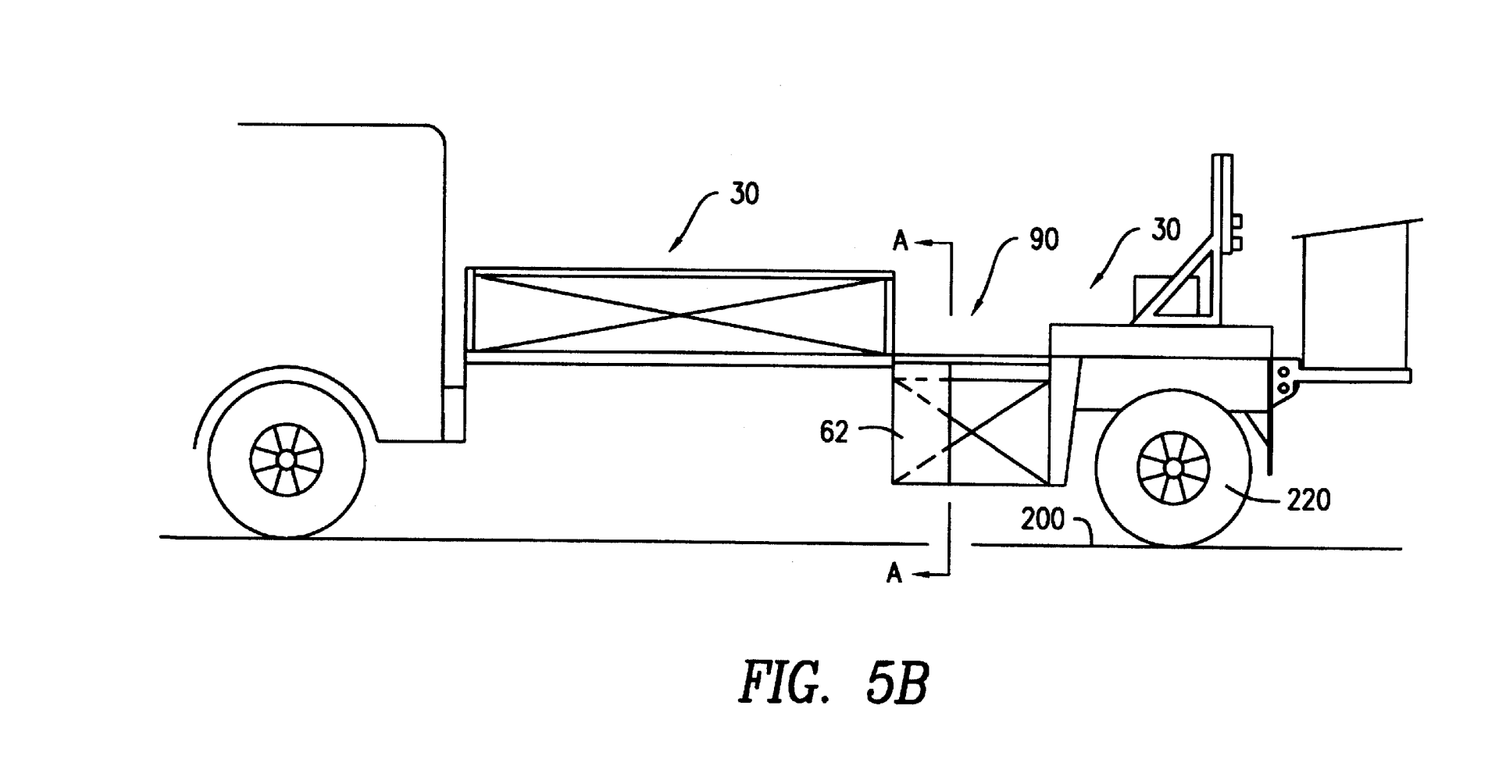
FIG. 5B is a side view of the mobile vehicle apparatus according to the alternative embodiment depicted in FIG. 5A.
Figure 5C:
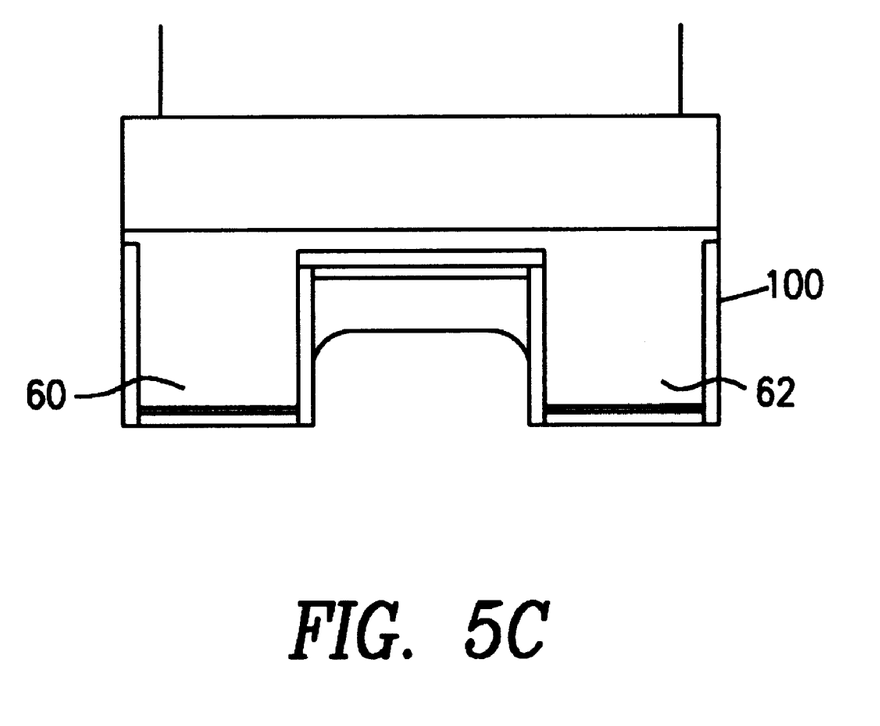
FIG. 5C is a cross-sectional view along lines A—A of FIG. 5B.
Figure 5D:
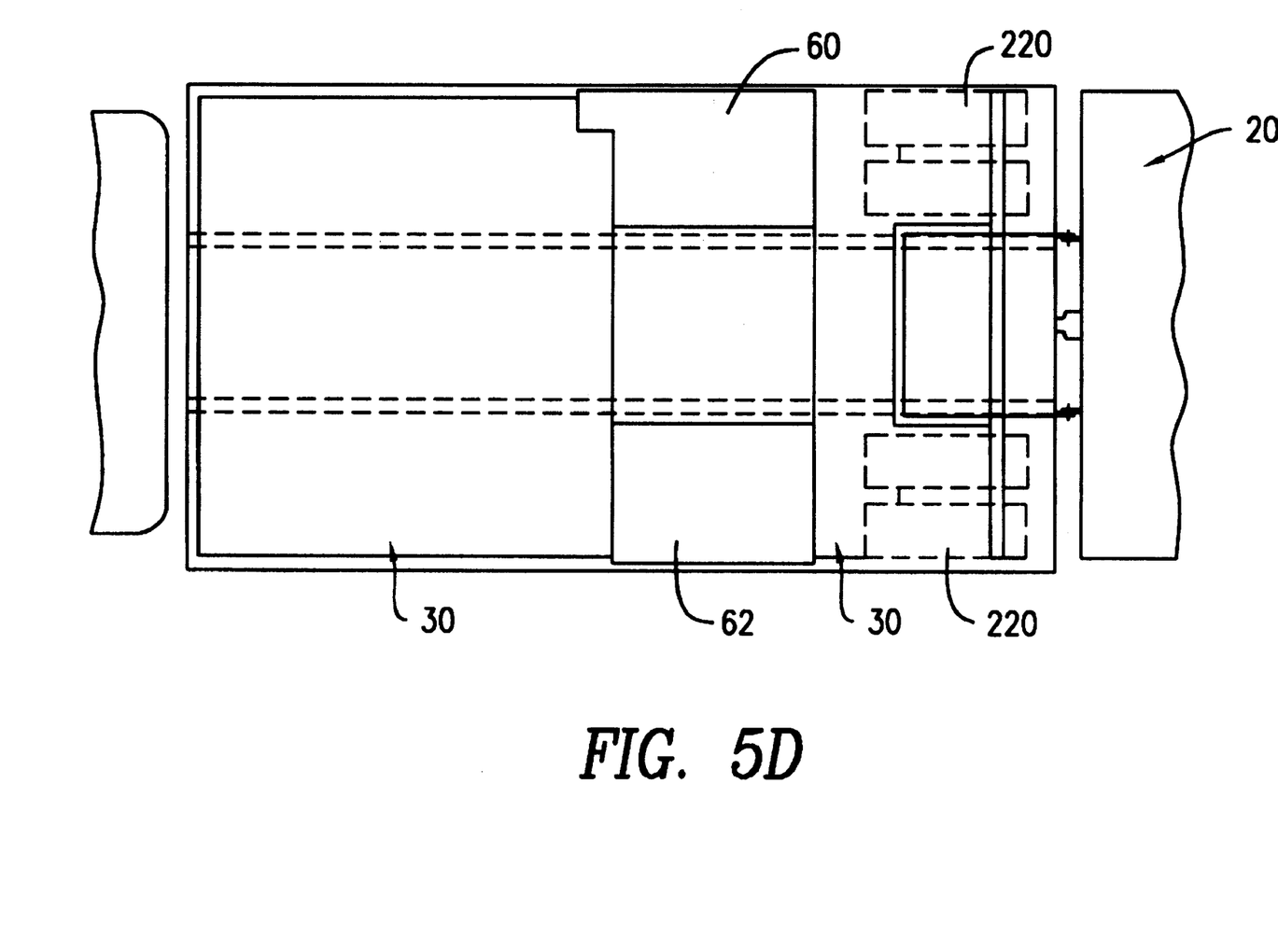
FIG. 5D is a top view of the alternative embodiment of FIG. 5A.

In an alternative embodiment depicted in FIG. 5A–D, the well area 90 is disposed at a location between the front wheels 210 and the rear wheels 220 in order to provide a more structurally secure and safer area for housing road crew members displacing the markers. This embodiment provides better protection to the crew member from the motoring public because the rear tandem wheels act as an additional buffer to the well structure. FIG. 5A provides a perspective view of the mobile unit according to this second embodiment, while FIGS. 5B–D provide side, top, and cross sectional views (along AA of FIG. 5B), respectively, of this well structure configuration. As shown in FIG. 5, the well area comprises oppositely disposed well structures 60, 62 separated by a stepped portion 72. Stepped area 72 comprises a planar surface 76 extending between opposite sidewalls and operable as either a seat for a road crew member or as a step to either of the other well structure or to bed portion 30. A parallel bar 84 extends across each well structure to prevent inadvertent exit. The bar comprises a first section 55 and a second section 57 which is retractable from the first section by conventional means to enable entry and exit from the well structure. As one can ascertain, the well area according to this embodiment is interposed between a first planar surface 40 and a second planar surface 41. A Sideboard area 83 and attenuation unit 20 (not shown) may be coupled to portions of the second planar surface 40 using conventional means and in a manner analogous to that described in the first embodiment, where such units attached to well area 90. Accordingly, in this embodiment, road markers 100 are accessible to a crew member within the well structure from either the first planar surface 40 or the second planar surface 41, thus allowing greater ease of handling and manipulation of road markers.

Figure 6A:
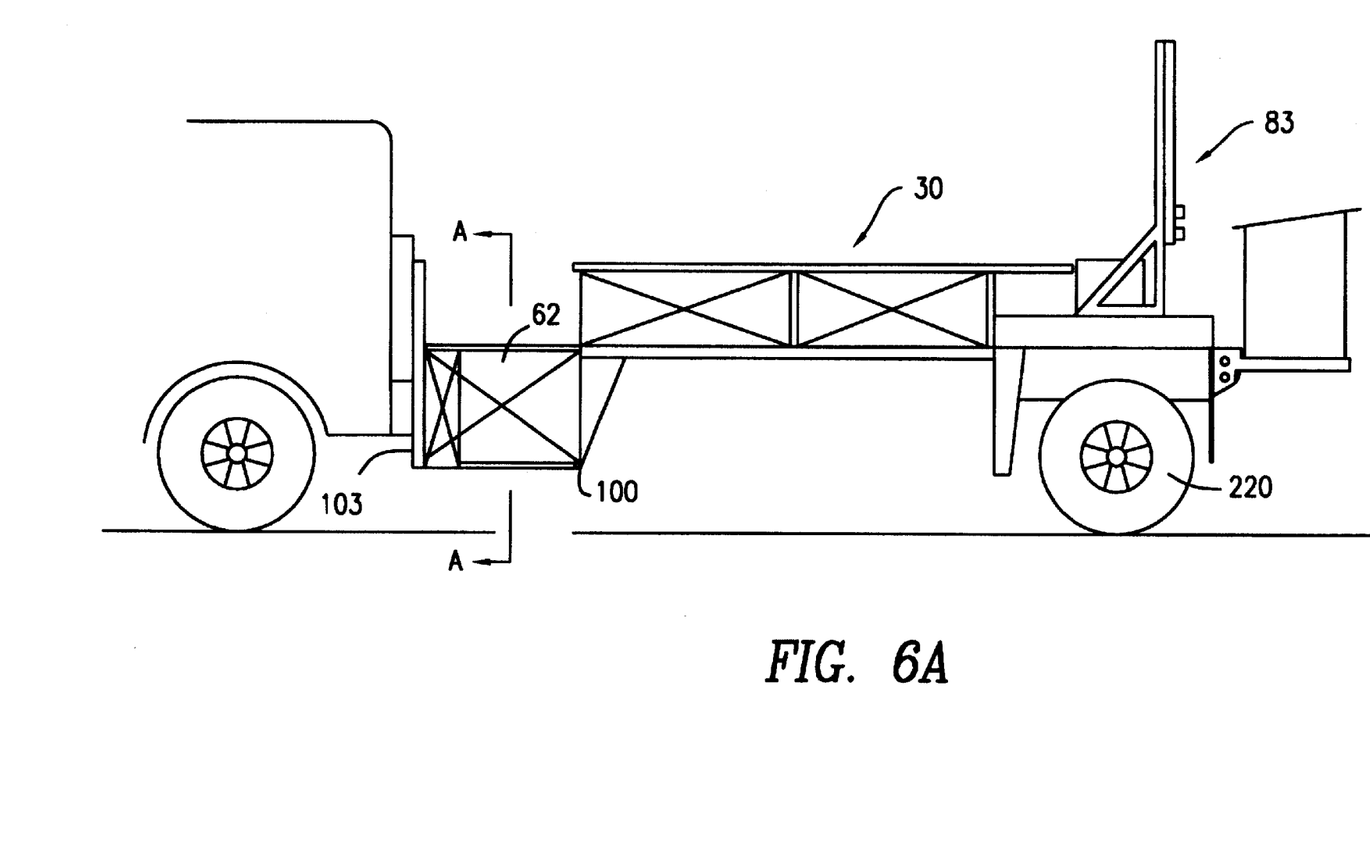
FIG. 6A is a side view of the mobile vehicle apparatus having a well structure for retaining a crew member for storing or retrieving markers according to another embodiment of the present invention.
Figure 6B:
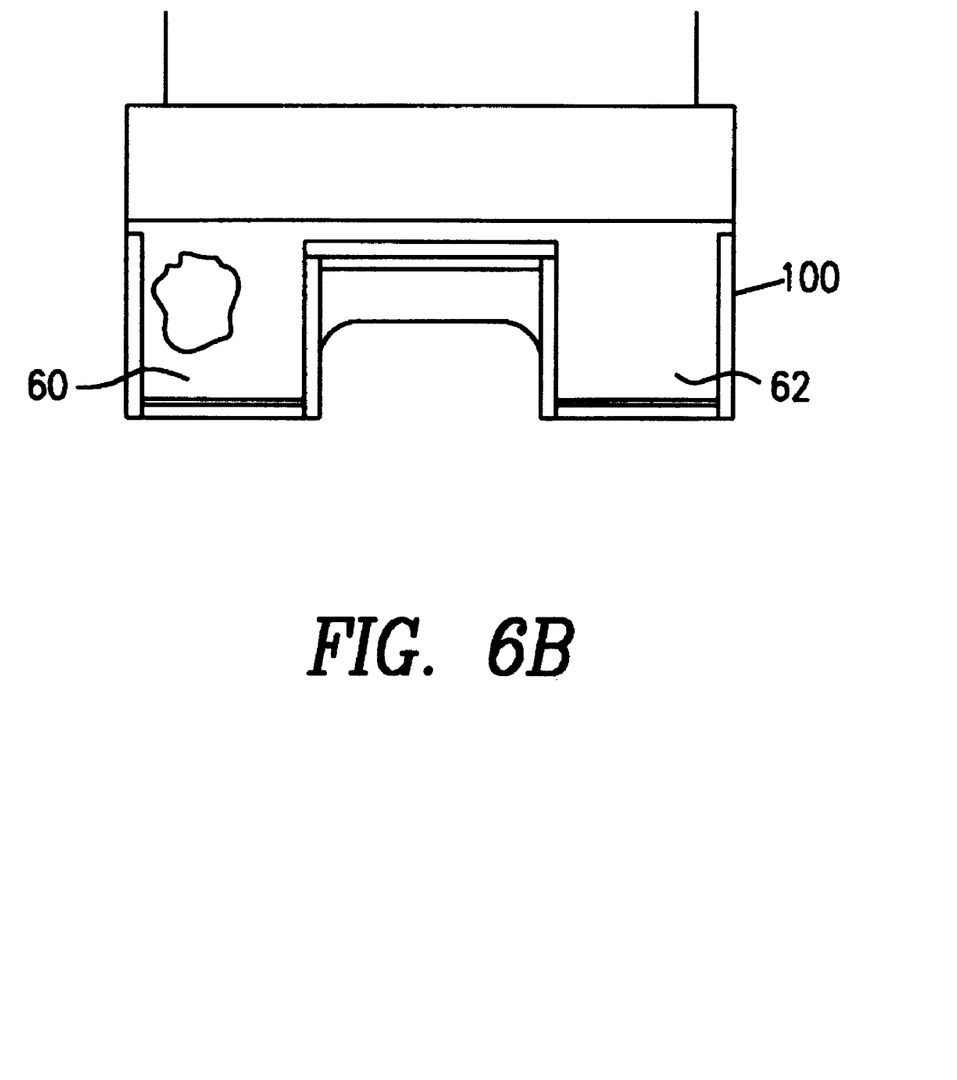
FIG. 6B is a cross-sectional view along lines A—A of FIG. 6A.
Figure 6C:
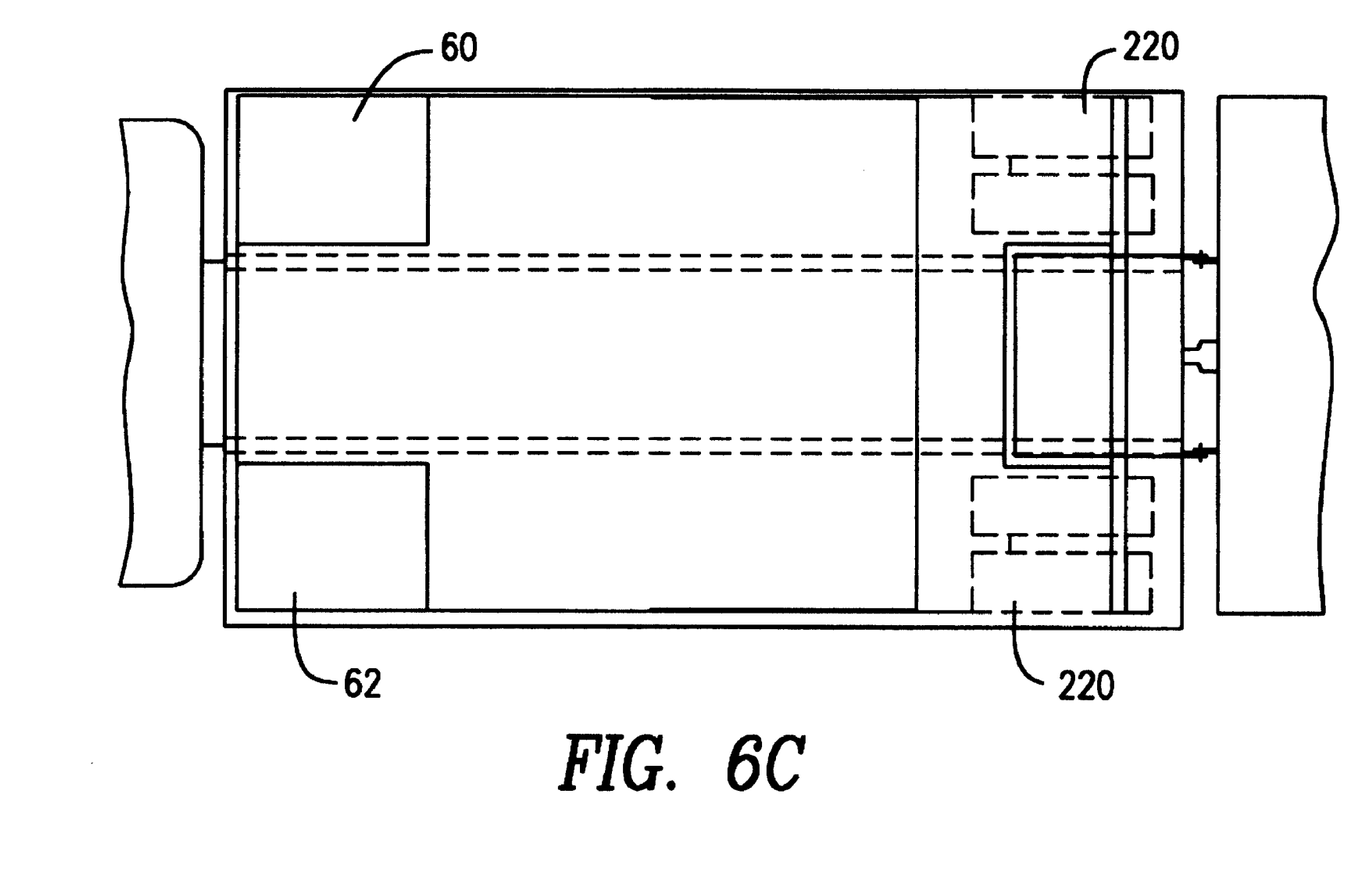
FIG. 6C is a top view of the alternative embodiment of FIG. 6A.

In a third embodiment illustrated in FIGS. 6A–C, the well area 90 comprising the two well structures 60, 62 may be attached directly to the rear cab portion of the truck vehicle and secured at wall 103 via conventional means. In this embodiment, the bed portion 30 on which the markers are retrieved is positioned distal to the truck bed in view of the location of each well structure. While this embodiment also provides a well structure which is located between the front and rear wheels, such a position has the disadvantage that the driver of the truck vehicle can not always or easily see the crew member in the well, due to the proximity and peripheral location of the structure vis-a-vis the cab driver. This is in contrast to both the first and second embodiments, which provide sufficient distance between the driver and the well or pod position to permit visual perception of the crew member.

As one can ascertain from the preceding discussion, the present invention allows one to securely store and place markers onto a surface by providing a first planar surface for storing the markers, coupling the well area to the end of the first planar surface, and positioning a person within the well area so that he/she may remove markers from the planar surface and place them on the road without exiting the truck. Conversely, the crew member may also remove markers from the road surface and store them onto the truck bed while the vehicle is in motion without undue risk of injury from the vehicle itself or from oncoming traffic. Preferably, the vehicle is moving at a relatively slow and even speed to allow efficient and safe placement/pickup of markers. Alternatively, the vehicle may come to a complete stop so as to allow a person to more safely place/retrieve a marker.

While preferred embodiments of the present invention have been shown, it should be understood that a person skilled in the art may make many variations and modifications to these embodiments utilizing functionally equivalent elements to be described herein without departing from the present scope of the invention. Any and all such variations or modifications as well as others which may become apparent to those skilled in the art, are intended to be included within the scope of the invention as defined by the attended claims.

What is claimed is:

1. A mobile unit operative for securely storing and placing markers onto a surface, comprising:
   a bed coupled to a portion of said mobile unit, said bed comprising:
      a planar surface for storing said markers;
      a well area coupled to a rear portion of said bed and having an at least one well structure coupled to said first planar surface, said well structure having a bottom and side walls for housing a person for placing or retrieving said markers on said surface, wherein said at least one well structure and said first planar surface are positionally aligned to permit retrieval/storage of a marker from said first planar surface for placement/retrieval on said surface via said person located within said well.

2. The mobile unit according to claim 1, wherein said well area comprises two well structures, each coupled to said end of said first planar surface and opposite one another for providing placement/retrieval of said markers on either side of said mobile unit.

3. The mobile unit according to claim 2, wherein each said well structure includes retention means for securing said person within said well during marker placement/retrieval.

4. The mobile unit according to claim 2, wherein said bed further comprises a second substantially flat planar surface coupled to said well area such that said well area is interposed between said first and second planar surfaces.

5. The unit according to claim 3, wherein said well structure further includes an opening on an outer side to permit entry and exit of said well from said mobile unit and wherein said retention means includes a detachable strap extending across said opening for retaining said person within said well structure.

6. The mobile unit according to claim 5, wherein said retention means further comprises a harness having a first end coupled to one of said side walls in said well structure and a second end for coupling to said person within said well structure for securing thereto.

7. The mobile unit according to claim 6, wherein said harness comprises:
   a belt for securing around a body of said person; and
   a chain having a first end coupled to said belt and a second end coupled to one of said side walls for securing thereto.

8. The unit according to claim 5, wherein said detachable strap comprises a metal chain.

9. The unit according to claim 3, wherein said retainer means comprises a parallel bar extending parallel to said first planar surface.

10. In a mobile unit, a method for securely storing and placing markers onto a surface comprising the steps of:
   providing a first planar surface for storing said markers;
   coupling at least one well structure to an end of said first planar surface, said well structure having a first side wall integrally coupled to said end of said first planar surface, a second side wall opposite said first side wall, an interior side wall connected between said first and second opposite side walls, an exterior opening and a bottom floor; and placing a person within said well and operating in a first mode by removing said markers from said first planar surface and placing on said road surface by said person within said well, and in a second mode, removing from said surface said markers and storing onto said first planar surface by said person within said well structure.

11. The method according to claim 10 wherein the step of coupling at least one well structure to an end of said first planar surface further comprises coupling of first well structure and a second well structure disposed opposite said first well structure to said first planar surface for permitting placement and retrieval of said markers on the first side of said road surface corresponding to said first well structure, and on a second opposite side of said road surface corresponding to said second well structure.

12. The method according to claim 10 further comprising the step of providing a detachable strap extending it across said exterior opening for retaining said person within said at least one well structure.

13. The method according to claim 10 further comprising the step of harnessing said person to one of said sidewalls for securing said person within said at least one well structure.

14. The method according to claim 13 wherein the step of harnessing comprises securing a belt around a body of said person coupling a chain to said belt and to one of said sidewalls for securing thereto.

15. The method according to claim 10 further comprising the step of mounting a crash attenuator unit to said mobile unit for attenuating wherein said at least one well structure is interposed between said crash attenuator unit and said first planar surface.

16. In a mobile vehicle having a crash attenuator adapted to be mounted to said vehicle to attenuate some of the energy of an impact, said crash attenuator comprising a frame adapted to be mounted on said vehicle, and a crushable, energy-absorbing crash cushion on the said frame, said mobile vehicle operative for securely storing and placing markers onto a road surface comprising:

a planar surface for storing and placing said markers onto said road surface; and a well area coupled to a portion of said planar surface and having at least one well structure coupled thereto, said well structure having a bottom and sidewalls for housing a person for placing or retrieving said markers on said surface, wherein said at least one well structure and said first planar surface are aligned with one another to permit retrieval/storage of a marker from said first planar surface for placement/retrieval onto said surface via said person located within said at least one well structure.

17. The mobile vehicle according to claim 16 wherein said well area comprises two well structures each said well structure coupled to said end of said first planar surface and opposite one another for providing placement/retrieval of said markers from opposite sides of said vehicle.

18. The mobile vehicle according to claim 17, wherein each said well structure includes retention means for securing said person within said well area during marker placement/retrieval.

19. The mobile vehicle according to claim 18, further comprising a second substantially flat planar surface coupled to said well area such that said well area is interposed between said first and second planar surfaces.

20. The mobile vehicle according to claim 17, wherein said well area is positioned between a front and rear set of wheels on said mobile vehicle.

21. The mobile unit according to claim 20, wherein said well area is directly coupled to a front cab portion such that said well area is interposed between said front cab portion and said planar surface.

* * * * *